(12) United States Patent
Kim

(10) Patent No.: US 9,927,928 B2
(45) Date of Patent: Mar. 27, 2018

(54) TOUCH PANEL INPUT DEVICE AND INPUT DETECTION METHOD THEREOF

(71) Applicant: HiDeep Inc., Gyeonggi-do (KR)

(72) Inventor: Bonkee Kim, Republic of Korea (KR)

(73) Assignee: HIDEEP INC. (KR)

( * ) Notice: Subject to any disclaimer, the term of this patent is extended or adjusted under 35 U.S.C. 154(b) by 96 days.

(21) Appl. No.: 14/453,936

(22) Filed: Aug. 7, 2014

(65) Prior Publication Data

US 2015/0042613 A1 Feb. 12, 2015

(30) Foreign Application Priority Data

Aug. 7, 2013 (KR) .......................... 10-2013-0093530

(51) Int. Cl.
*G06F 3/041* (2006.01)
*G06F 3/044* (2006.01)
*G06F 17/16* (2006.01)

(52) U.S. Cl.
CPC ............ *G06F 3/044* (2013.01); *G06F 3/0416* (2013.01); *G06F 17/16* (2013.01)

(58) Field of Classification Search
CPC ....... G06F 3/044; G06F 3/0412; G06F 3/0416
USPC ................................................ 345/174, 173
See application file for complete search history.

(56) References Cited

U.S. PATENT DOCUMENTS

| | | | |
|---|---|---|---|
| 2008/0158167 A1* | 7/2008 | Hotelling | G06F 3/0416 345/173 |
| 2012/0019474 A1* | 1/2012 | Hsieh | G06F 3/0418 345/174 |
| 2012/0056841 A1* | 3/2012 | Krenik | G06F 3/044 345/174 |
| 2013/0211757 A1* | 8/2013 | Miyamoto | G06F 3/0416 702/65 |
| 2014/0139480 A1* | 5/2014 | Seo | G06F 3/044 345/174 |
| 2014/0292709 A1* | 10/2014 | Mizuhashi | G06F 3/0416 345/174 |
| 2014/0375591 A1* | 12/2014 | Chang | G06F 3/044 345/174 |

FOREIGN PATENT DOCUMENTS

WO WO 2012063520 A1 * 5/2012 ............. G06F 3/044

* cited by examiner

*Primary Examiner* — Yuzhen Shen
(74) *Attorney, Agent, or Firm* — The Belles Group, P.C.

(57) ABSTRACT

A touch panel input device and an input detection method thereof are provided. The touch panel input device including: a driving signal supplier which simultaneously applies a first driving signal and a second driving signal to at least two of the plurality of driving signal electrodes respectively, wherein the first and second driving signals include a plurality of pulses in a first interval and a second interval respectively, wherein, in one of the first and second intervals, the plurality of pulses of the second driving signal is applied differently from the plurality of pulses of the first driving signal; and a signal sensor receiving sensing signals including information on capacitances of at least two of the plurality of the node capacitors from the plurality of sensing signal electrodes in the first and second intervals.

20 Claims, 6 Drawing Sheets

TOUCH PANEL INPUT DEVICE AND INPUT DETECTION METHOD THEREOF

CROSS REFERENCE TO RELATED APPLICATIONS

Priority is claimed under 35 U.S.C. § 119 to Korean Patent Application No.: 10-2013-0093530, filed Aug. 7, 2013, the disclosure of which is incorporated herein by reference in its entirety

FIELD OF THE INVENTION

The embodiment of the present invention relates to a touch panel input device and an input detection method thereof, and more particularly to a touch panel input device capable of improving a touch sensitivity by reducing noise, and an input detection method thereof.

BACKGROUND OF THE INVENTION

In general, with the development of electronic communication technologies, a variety of electronic devices are being provided. Such an electronic device increasingly has a tendency to emphasize manipulation easiness for users and a good design. It is diversification of an input device represented by a keyboard or a keypad that is emphasized according to the trend.

The input device has been developed from data processing through the input device, e.g., a keyboard, a keypad, etc., to an available touch panel functioning as both an input device and an output device. The touch panel commonly designates an input device allowing a user to input by touching a screen of a display device without separate input equipment.

The touch panel detects whether the touch is input or not by detecting a capacitance stored in a plurality of formed node capacitors. However, since the capacitance of the node capacitor is changed due to the influence of noise, etc., generated from the display device, there is a possibility of malfunction of the touch panel.

SUMMARY OF THE INVENTION

One embodiment is a touch panel input device including: a touch panel including a plurality of node capacitors, each of which is formed by one of a plurality of driving signal electrodes and one of a plurality of sensing signal electrodes; a driving signal supplier simultaneously applying a first driving signal and a second driving signal to at least two of the plurality of driving signal electrodes respectively, wherein the first and second driving signals include a plurality of pulses in a first interval and a second interval respectively, wherein at least one of the plurality of pulses has a width different from that of another pulse, and wherein at least one of the plurality of pulses of the second driving signal has a phase different from those of the plurality of pulses of the first driving signal in one of the first and second intervals; and a signal sensor receiving sensing signals including information on capacitances of at least two of the plurality of the node capacitors from the plurality of sensing signal electrodes in the first and second intervals.

At least one of the plurality of pulses may be a high-state signal, and another pulse may be a low-state signal.

The pulse width of the high-state signal may be different from the pulse width of the low-state signal.

The high-state signal and the low-state signal may be alternately generated.

In the second interval, a duty ratio of at least one of the plurality of pulses of the first driving signal may be different from a duty ratio of at least one of the plurality of pulses of the second driving signal.

The signal sensor may determine the number for which the sensing signal is received in correspondence with the number of the plurality of pulses in the first and second intervals, and may produce the information on the capacitance of the node capacitor by summing up the received sensing signals.

The touch panel input device may further include a controller. The controller may further include a memory which stores codes corresponding to the first interval and the second interval. Forms of the first driving signal and the second driving signal may be determined by the codes.

Another embodiment is an input detection method of a touch panel including a plurality of node capacitors, each of which is formed by one of a plurality of driving signal electrodes and one of a plurality of sensing signal electrodes. The method includes: applying simultaneously a first driving signal and a second driving signal to at least two of the plurality of driving signal electrodes respectively, wherein the first and second driving signals include a plurality of pulses in a first interval and a second interval respectively, wherein at least one of the plurality of pulses has a width different from that of another pulse, and wherein at least one of the plurality of pulses of the second driving signal may be applied to have a phase different from the pulses of the plurality of pulses of the first driving signal in one of the first and second intervals; receiving sensing signals including information on capacitances of at least two of the plurality of the node capacitors from the plurality of sensing signal electrodes in the first and second intervals by a sensing signal detector; and extracting touch information of the touch panel by using the information on the capacitances of the at least two node capacitors by the sensing signal detector.

The pulse width of the high-state signal may be different from the pulse width of the low-state signal.

The widths of the plurality of pulses may be increased with the lapse of time.

In the second interval, a duty ratio of at least one of the plurality of pulses of the first driving signal may be different from a duty ratio of at least one of the plurality of pulses of the second driving signal.

The sensing signal detector may determine the number for which the sensing signal is received in correspondence with the number of the plurality of pulses in the first and second intervals, and may produce the information on the capacitance of the node capacitor by summing up the received sensing signals.

DETAILED DESCRIPTION OF THE INVENTION

Figure 1:
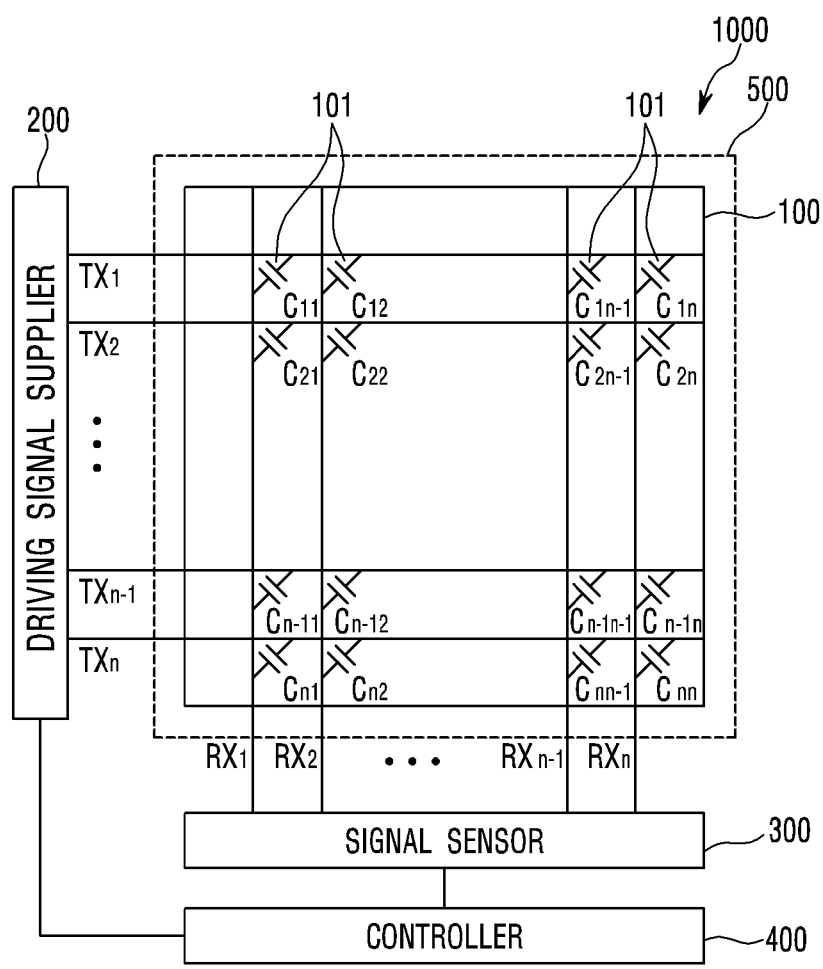
FIG. 1 is a view showing a structure of an embodiment of a touch panel input device according to an embodiment of the present invention.

The following detailed description of the present invention shows a specified embodiment of the present invention and will be provided with reference to the accompanying drawings. The embodiment will be described in enough detail that those skilled in the art are able to embody the present invention. It should be understood that various embodiments of the present invention are different from each other and need not be mutually exclusive. For example, a specific shape, structure and properties, which are described in this disclosure, may be implemented in other embodiments without departing from the spirit and scope of the present invention with respect to one embodiment. Also, it should be noted that positions or placements of individual components within each disclosed embodiment may be changed without departing from the spirit and scope of the present invention. Therefore, the following detailed description is not intended to be limited. If adequately described, the scope of the present invention is limited only by the appended claims of the present invention as well as all equivalents thereto. Similar reference numerals in the drawings designate the same or similar functions in many aspects.

Hereafter, a touch panel input device and an input detection method thereof will be described with reference to the accompanying drawings.

FIG. 1 is a view showing a structure of an embodiment of a touch panel input device according to an embodiment of the present invention.

Referring to FIG. 1, a touch panel input device 1000 includes a touch panel 100, a driving signal supplier 200 and a signal sensor 300. The touch panel 100 includes a plurality of node capacitors 101. Each node capacitor 101 may be formed by one of a plurality of driving signal electrodes TX1, TX2, . . . , TXn-1 and TXn and one of a plurality of sensing signal electrodes RX1, RX2, . . . , RXn-1 and RXn. The driving signal supplier 200 simultaneously applies a first driving signal and a second driving signal to at least two of the plurality of driving signal electrodes TX1, TX2, . . . , TXn-1 and TXn respectively. The first driving signal and the second driving signal include a plurality of pulses in a first interval and a second interval respectively. At least one of the plurality of pulses has a width different from that of another pulse. At least one of the plurality of pulses of the second driving signal has a phase different from those of the plurality of pulses of the first driving signal in one of the first and second intervals. The signal sensor 300 receives sensing signals including information on capacitances of at least two of the plurality of the node capacitors 101 from the plurality of sensing signal electrodes RX1, RX2, . . . , RXn-1 and RXn in at least the first and second intervals.

The touch panel 100 includes the plurality of driving signal electrodes TX1, TX2, . . . , TXn-1 and TXn and the plurality of sensing signal electrodes RX1, RX2, . . . , RXn-1 and RXn and may be disposed on or within a display unit 500. However, the location of the touch panel 100 is not limited to this. A liquid crystal display (LCD), an organic light emitting display (OLED) and the like may be taken as an example of the display unit 500 in which the touch panel 100 is formed. However, the example of the display unit 500 is not limited to this.

In the following descriptions and accompanying drawings, it is shown that the plurality of driving signal electrodes TX1, TX2, . . . , TXn-1 and TXn and the plurality of sensing signal electrodes RX1, RX2, . . . , RXn-1 and RXn of the touch panel 100 form an orthogonal array. However, the embodiment of the present invention is not limited to this. The plurality of driving signal electrodes TX1, TX2, . . . , TXn-1 and TXn and the plurality of sensing signal electrodes RX1, RX2, . . . , RXn-1 and RXn may have an array of arbitrary dimension, for example, a diagonal array, a concentric array, a 3-dimensional random array, etc., and an array obtained by the application of them. The plurality of driving signal electrodes TX1, TX2, . . . , TXn-1 and TXn and the plurality of sensing signal electrodes RX1, RX2, . . . , RXn-1 and RXn may be formed of a transparent conductive material (for example, indium tin oxide (ITO) or antimony tin oxide (ATO)) and the like. However, there is no limit to this. The plurality of driving signal electrodes TX1, TX2, . . . , TXn-1 and TXn and the plurality of sensing signal electrodes RX1, RX2, . . . , RXn-1 and RXn may be formed of another transparent material or an opaque conductive material like copper, etc. Also, although it is shown that the number of the plurality of driving signal electrodes TX1, TX2, . . . , TXn-1 and TXn is the same as the number of the plurality of sensing signal electrodes RX1, RX2, . . . , RXn-1 and RXn, there is no limit to this. The numbers may be changed according to the shape of the touch panel 100.

In the touch panel 100, the plurality of node capacitors 101 may be formed by the plurality of driving signal electrodes TX1, TX2, . . . , TXn-1 and TXn and the plurality of sensing signal electrodes RX1, RX2, . . . , RXn-1 and RXn. Here, although the plurality of driving signal electrodes TX1, TX2, . . . , TXn-1 and TXn and the plurality of sensing signal electrodes RX1, RX2, . . . , RXn-1 and RXn are represented respectively by lines, they may be actually implemented with an electrode pattern. Also, the width of the plurality of driving signal electrodes TX1, TX2, . . . , TXn-1 and TXn may be different from the width of the plurality of sensing signal electrodes RX1, RX2, . . . , RXn-1 and RXn.

The driving signal supplier 200 applies driving signals to the plurality of driving signal electrodes TX1, TX2, . . . , TXn-1 and TXn. When the driving signals are applied to the plurality of driving signal electrodes TX1, TX2, . . . , TXn-1 and TXn formed in the touch panel 100, the driving signals may be applied to one ends of the node capacitors 101. The applying of the driving signal may mean that a pulse is generated and transmitted to the driving signal electrodes TX1, TX2, . . . , TXn-1 and TXn. The pulse may be in a high state or low state. Regarding the driving signals applied by the driving signal supplier 200, it may be intended that, in one interval, the driving signals are simultaneously applied to at least two of the plurality of driving signal electrodes TX1, TX2, . . . , TXn-1 and TXn. Here, the "simultaneously" does not mean only the fact that the driving signals are applied to the at least two driving signal electrodes at the complete same time, and may mean that the driving signal is applied at a certain time interval. The first driving signal and the second driving signal which are respectively applied to the two driving signal electrodes at the same time may include the plurality of pulses. Also, the first and second driving signals are divided by the first and second intervals.

At least one of a frequency and a phase of the plurality of pulses in one interval of the first and second intervals may be set to be different from that of the other interval.

The following description will focus on an effect of a case where the driving signal is applied to at least two driving signal electrodes at the same time.

When the driving signals are applied to the plurality of driving signal electrodes, a relationship between the signal and noise may be represented by the following equation (1).

$$\frac{S}{N} = \frac{E_c}{N} * \frac{R}{W} \qquad \text{Equation (1)}$$

Here, "S", "N", "$E_c$", "R" and "w" may represent the output of the signal, the output of noise, energy, a transmission ratio of the signal and a bandwidth, respectively.

If four first to fourth driving signals tx1 to tx4 are sequentially applied to the first to fourth driving signal electrodes TX1 to TX4, one driving signal may be applied to one driving signal electrode for a time period of 1t (t is an arbitrary time). That is, when the first to fourth driving signals tx1 to tx4 are supplied for a total time period of 4t, the driving signal may be applied to each of the first to fourth driving signal electrodes TX1 to TX4 for the time period of 1t.

Contrary to this, in the case where the first to fourth driving signals tx1 to tx4 are applied for the time period of 4t, when the plurality of driving signals are simultaneously applied to the first to fourth driving signal electrodes TX1 to TX4, in other words, when the first to fourth driving signals tx1 to tx4 are simultaneously applied to the first to fourth driving signal electrodes TX1 to TX4, the driving signal may be applied to each of the first to fourth driving signal electrodes TX1 to TX4 for the time period of 4t.

That is, when the driving signal is simultaneously applied to the four driving signal electrodes, the driving signal may be applied to one driving signal electrode for a time period four times longer than when the driving signal is sequentially applied to the four driving signal electrodes one by one.

Also, when the driving signal is simultaneously applied so that the driving signal is applied to the one driving signal electrode for a time period four times, the magnitude of "R" of the equation (1) may be reduced to 1/4. An S/N ratio is constant in the touch panel. Therefore, when the magnitude of "R" is reduced, the ratio of $E_c/N$ increases. That is, the $E_c/N$ is improved, and thus, touch recognition of the touch panel can be improved.

The driving signal supplier 200 may simultaneously apply the first and second driving signals including the plurality of pulses to at least two of the plurality of driving signal electrodes TX1, TX2, . . . , TXn-1 and TXn. When the driving signal supplier 200 applies the first and second driving signals, the node capacitors 101 to which the first and second driving signals are transmitted are charged by the first driving signal or the second driving signal. Here, the form of the plurality of pulses of the first driving signal in the first interval may be the same as the form of the plurality of pulses of the first driving signal in the second interval. However, the form of the plurality of pulses of the second driving signal in the first interval may be different from the form of the plurality of pulses of the second driving signal in the second interval. The forms of the plurality of pulse of the driving signals will be described in more detail in FIGS. 3 to 6. Also, since the forms of the plurality of pulse of the driving signals may be different, a voltage which is applied to each of the node capacitors 101 in the first interval may be different from a voltage which is applied to each of the node capacitors 101 in the second interval. Also, the sum of the capacitances of the node capacitors 101 charged in the first interval may be different from the sum of the capacitances of the node capacitors 101 charged in the second interval.

In the embodiment of the present invention, the plurality of driving signal electrodes TX1, TX2, . . . , TXn-1 and TXn are divided into groups, each of which consists of four driving signal electrodes. Then, the driving signal supplier 200 may simultaneously apply the driving signals to the driving signal electrodes belonging to the same group. Here, the first driving signal among the four driving signals has the same frequency and phase in the first to fourth intervals. At least one of the frequency and phase of each of the remaining second to fourth driving signals may be set to be different from that of the others in the second to fourth intervals other than the first interval.

The signal sensor 300 detects the sensing signal which is applied to the plurality of sensing signal electrodes RX1, RX2, . . . , RXn-1 and RXn. The sensing signal may include information on the size of the capacitance the node capacitors 101 formed by the plurality of driving signal electrodes TX1, TX2, . . . , TXn-1 and TXn and the plurality of sensing signal electrodes RX1, RX2, . . . , RXn-1 and RXn. When the first driving signal and the second driving signal are simultaneously applied to at least two driving signal electrodes, the signal sensor 300 operates the sensing signals generated in the first interval and the sensing signal generated in the second interval, and then identifies the capacitance of each of the node capacitors to which the first driving signal and the second driving signal are transmitted. Therefore, the capacitances of the plurality of node capacitors of the touch panel 100 can be recognized at the same time, so that touches on the multiple points in the touch panel 100 can be recognized at the same time.

In the embodiment of the present invention, the number for which the sensing signal is received is determined in correspondence with the number of the plurality of pulses in the first and second intervals, and the information on the capacitance of the node capacitor is produced by summing up the received sensing signals. More specifically, when the plurality of pulses of the driving signal are transmitted to one end of the node capacitor, i.e., the driving signal electrode, the other end of the node capacitor, i.e., the sensing signal electrode can detect the voltage change of the other end of the node capacitor in correspondence with the plurality of pulses. Also, the voltage of the sensing signal is identified by summing up the voltage change of the other end of the mode capacitor, and the capacitance of the node capacitor can be identified by using voltage. In this manner, the noise of the touch panel input apparatus 1000 is distributed, thereby improving the touch sensitivity of the touch panel 100.

In the embodiment of the present invention, the touch panel input apparatus 1000 controls the driving signal supplier 200 and the signal sensor 300, so that the driving signal is applied from the driving signal supplier 200 to the plurality of driving signal electrodes TX1, TX2, . . . , TXn-1 and TXn, and may further include a controller 400 causing the signal sensor 300 to detect the sensing signal which is applied to the plurality of sensing signal electrodes RX1, RX2, . . . , RXn-1 and RXn. Further, the touch panel input apparatus 1000 causes the signal sensor 300 to simply detect the driving signal generated in the first and second intervals without operating the driving signal and causes the controller 400 to receive and operate the sensing signal detected by the signal sensor 300, and then to identify the capacitance of each of the node capacitors to which the first and second driving signals are transmitted. As a result, the controller 400 is able to generate touch location information.

Figure 2:
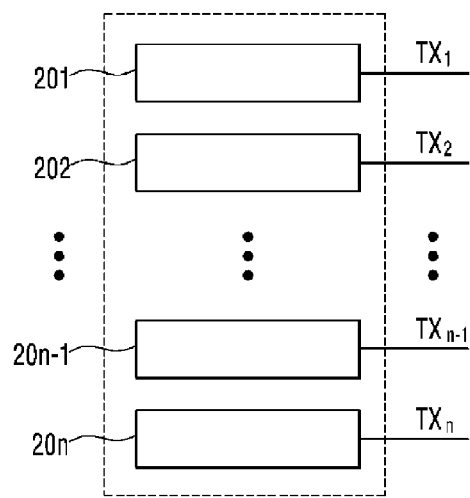
FIG. 2 shows a configuration of the driving signal supplier applied to FIG. 1.

FIG. 2 shows a configuration of the driving signal supplier applied to FIG. 1.

Referring to FIG. 2, the driving signal supplier 200 may include a plurality of driving blocks 201, 202, ..., 20n-1 and 20n. Each driving block may be connected to one of the plurality of driving signal electrodes TX1, TX2, ..., TXn-1 and TXn and may supply the driving signal to the driving signal electrode. Also, at least two driving blocks among the plurality of driving blocks 201, 202, ..., 20n-1 and 20n may simultaneously supply the driving signal to at least two mutually different driving signal electrodes. In the embodiment of the present invention, the plurality of driving blocks 201, 202, ..., 20n-1 and 20n receives a code of the driving signal from the controller 400 and generates the driving signal. The code of the driving signal will be described in the following FIGS. 3 to 5.

Figure 3:
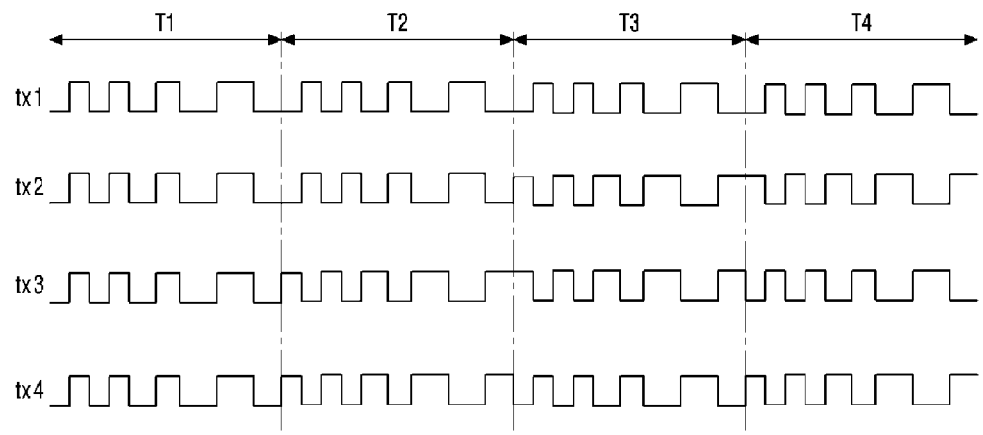
FIG. 3 is a timing diagram showing a first embodiment of a driving signal generated the driving signal supplier shown in FIG. 2.

FIG. 3 is a timing diagram showing a first embodiment of the driving signal generated the driving signal supplier shown in FIG. 2.

Referring to FIG. 3, the driving signal supplier 200 may simultaneously apply the plurality of driving signals to the plurality of driving signal electrodes. However, for convenience of description, it is assumed that the first to fourth driving signals tx1 to tx4 are simultaneously applied to the first to fourth driving signal electrodes TX1 to TX4. In other words, the first to fourth driving signals tx1 to tx4 are simultaneously output from the first to fourth driving blocks 201 to 204. Also, the first to fourth driving signals tx1 to tx4 may be divided by the first to fourth intervals T1 to T4 respectively. The first to fourth driving signals tx1 to tx4 may include the plurality of pulses in each interval. The widths of the plurality of pulses are different from each other, so that the frequencies of the plurality of pulses may not constant in each interval. The code of the driving signal in each interval may be represented by 1 or 0 depending on the phases of the plurality of pulses. That is, when the pulses have the same phase, the code is represented by 1, and when the pulses have a 180 degree phase difference from each other, the code is represented by 0.

In the first interval T1, the same phase may be applied to the plurality of pulses of each of the first to fourth driving signals tx1 to tx4. In the second interval T2, the same phase as that in the first interval T1 may be applied to the plurality of pulses of each of the first and second driving signals tx1 and tx2. In the second interval T2, a phase 180 degree different from that in the first interval T1 may be applied to the plurality of pulses of each of the third and fourth driving signals tx3 and tx4. In the third interval T3, the same phase as that in the first interval T1 may be applied to the plurality of pulses of each of the first driving signal tx1 and the fourth driving signal tx4. In the third interval T3, a phase 180 degree different from that in the first interval T1 may be applied to the plurality of pulses of each of the second and third driving signals tx2 and tx3. In the fourth interval T4, the same phase as that in the first interval T1 may be applied to the plurality of pulses of each of the first and third driving signals tx1 and tx3. In the fourth interval T4, a phase 180 degree different from that in the first interval T1 may be applied to the plurality of pulses of each of the second and fourth driving signals tx2 and tx4.

Since the phase of the first driving signal tx1 is not changed in the first to fourth intervals T1 to T4, the code of the first driving signal tx1 may be (1, 1, 1, 1) in the first to fourth intervals T1 to T4. While the phase of the second driving signal tx2 is not changed in the first and second intervals T1 and T2, the phase of the second driving signal tx2 is changed in the third and fourth intervals T3 and T4. Accordingly, the code of the second driving signal tx2 may be (1, 1, 0, 0) in the first to fourth intervals T1 to T4. While the phase of the third driving signal tx3 is not changed in the first and fourth intervals T1 and T4, the phase of the third driving signal tx3 is changed in the second and third intervals T2 and T3. Accordingly, the code of the third driving signal tx3 may be (1, 0, 0, 1) in the first to fourth intervals T1 to T4. While the phase of the fourth driving signal tx4 is not changed in the first and third intervals T1 and T3, the phase of the fourth driving signal tx4 is changed in the second and fourth intervals T2 and T4. Accordingly, the code of the fourth driving signal tx4 may be (1, 0, 1, 0) in the first to fourth intervals T1 to T4.

Figure 4:
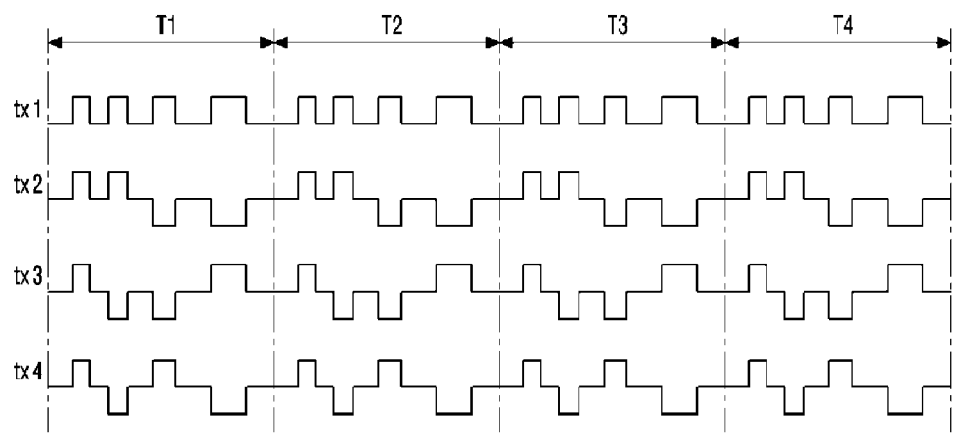
FIG. 4 is a timing diagram showing a second embodiment of the driving signal generated the driving signal supplier shown in FIG. 2.

FIG. 4 is a timing diagram showing a second embodiment of the driving signal generated the driving signal supplier shown in FIG. 2.

Referring to FIG. 4, the driving signal supplier 200 may simultaneously apply the plurality of driving signals to the plurality of driving signal electrodes. However, for convenience of description, it is assumed that the first to fourth driving signals tx1 to tx4 are simultaneously applied to the first to fourth driving signal electrodes TX1 to TX4. In other words, the first to fourth driving signals tx1 to tx4 are simultaneously output from the first to fourth driving blocks 201 to 204. The first to fourth driving signals tx1 to tx4 may include a pulse which is in a high and/or a low state in each interval. The code of driving signal in each interval may be represented by 1 or 0 in correspondence with the high or low state of the pulse. Irrespective of the high or low state, the widths of at least two of the plurality of pulses may be different from those of the others.

In the first interval T1, the first driving signal tx1 may include four high-state pulses. Since the four pulses are in the high state, the code of the first driving signal tx1 may be (1, 1, 1, 1). The second driving signal tx2 includes the high-state pulse and the low-state pulse. First, after two high-state pulses are repeated, two low-state pulses may be repeated. In the second driving signal tx2, since the high-state pulse is repeated and then the low-state pulse is repeated, the code of the second driving signal tx2 may be (1, 1, 0, 0). In the third driving signal tx3, after the high-state pulse is generated and two low-state pulses are repeated, the high-state pulse is again generated. Therefore, the code of the third driving signal tx3 may be (1, 0, 0, 1). In the fourth driving signal tx4, the high and low state pulses may be repeated. Since the high and low state pulses are repeated, the code of the fourth driving signal tx4 may be (1, 0, 0, 1).

As with the first interval T1, the first to fourth driving signals tx1 to tx4 may be applied in the second to fourth intervals T2 to T4. That is, the first to fourth driving signals tx1 to tx4 may be repeatedly applied in the second to fourth intervals T2 to T4.

While it has been described that when the pulse is in the high state, the code is set to 1, and when the pulse is in the low state, the code is set to 0, there is no limit to this.

Figure 5:
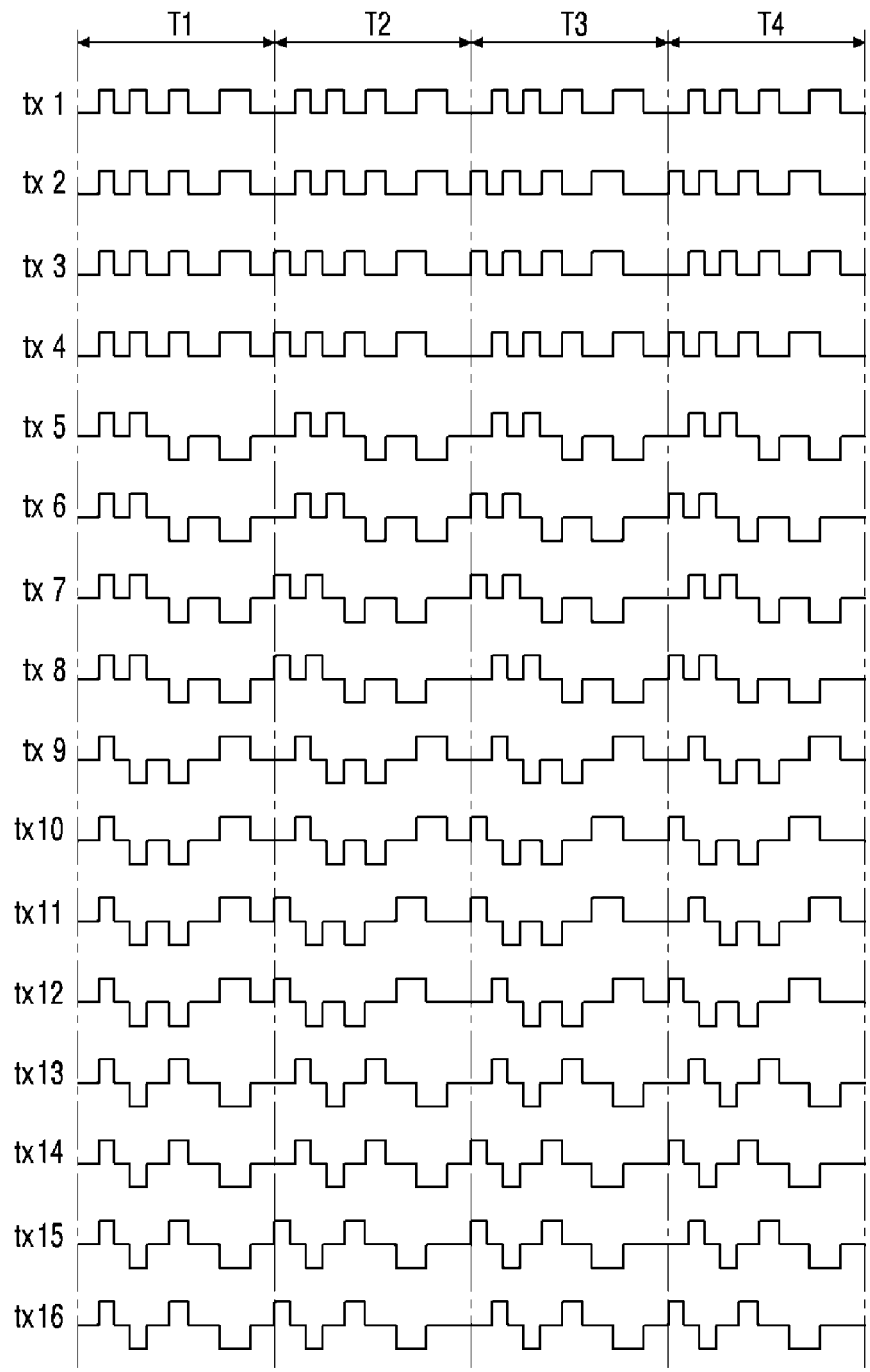
FIG. 5 is a timing diagram showing a third embodiment of the driving signal generated the driving signal supplier shown in FIG. 2.

FIG. 5 is a timing diagram showing a third embodiment of the driving signal generated the driving signal supplier shown in FIG. 2.

Referring to FIG. 5, the driving signal supplier 200 may simultaneously apply the plurality of driving signals to the plurality of driving signal electrodes. However, for convenience of description, it is assumed that the first to sixteenth driving signals tx1 to tx16 are simultaneously applied to the first to sixteenth driving signal electrodes TX1 to TX16. In other words, the first to sixteenth driving signals tx1 to tx16 are simultaneously output from the first to sixteenth driving blocks 201 to 216. Also, the first to sixteenth driving signals tx1 to tx16 may be divided by the first to fourth intervals T1 to T4. The first to sixteenth driving signals tx1 to tx16 may include the plurality of pulses in each interval. The first to sixteenth driving signals tx1 to tx16 may include the pulse which is in the high and/or the low state in each repeating interval. The widths of at least two of the plurality of pulses may be different from those of the others. The code of the driving signal in each interval may be represented by 1 or 0 in correspondence with the high or low state of the pulse and the phase of the pulse. That is, if the phase is not changed in each interval, the code is set to 1 by the high-state pulse and is set to 0 by the low-state pulse. However, if the phase is changed in each interval, the code is set to 0 by the high-state pulse and is set to 1 by the low-state pulse.

The first to fourth driving signals tx1 to tx4 may include the plurality of pulses, all of which are in the high state in the first to fourth intervals T1 to T4. The phase of the first driving signal tx1 is not changed in the first to fourth intervals T1 to T4. Therefore, the code of the first driving signal tx1 may be (1, 1, 1, 1, 1, 1, 1, 1, 1, 1, 1, 1, 1, 1, 1, 1) in the first to fourth intervals T1 to T4. While the phase of the second driving signal tx2 is not changed in the first and second intervals T1 and T2, the phase of the second driving signal tx2 is changed in the third and fourth intervals T3 and T4. Accordingly, the code of the second driving signal tx2 may be (1, 1, 1, 1, 1, 1, 1, 1, 0, 0, 0, 0, 0, 0, 0, 0) in the first to fourth intervals T1 to T4. While the phase of the third driving signal tx3 is not changed in the first and fourth intervals T1 and T4, the phase of the third driving signal tx3 is changed in the second and third intervals T2 and T3. Accordingly, the code of the third driving signal tx3 may be (1, 1, 1, 1, 0, 0, 0, 0, 0, 0, 0, 0, 1, 1, 1, 1) in the first to fourth intervals T1 to T4. While the phase of the fourth driving signal tx4 is not changed in the first and third intervals T1 and T3, the phase of the fourth driving signal tx4 is changed in the second and fourth intervals T2 and T4. Accordingly, the code of the fourth driving signal tx4 may be (1, 1, 1, 1, 0, 0, 0, 0, 1, 1, 1, 1, 0, 0, 0, 0) in the first to fourth intervals T1 to T4.

A fifth to eight driving signals tx5 to tx8 may include two high-state pulses and two low-state pulses in the first to fourth intervals T1 to T4. After the two high-state pulses are generated, the two low-state pulses may be generated. The phase of the fifth driving signal tx5 is not changed in the first to fourth intervals T1 to T4, the code of the fifth driving signal tx5 may be (1, 1, 0, 0, 1, 1, 0, 0, 1, 1, 0, 0, 1, 1, 0, 0) in the first to fourth intervals T1 to T4. While the phase of the sixth driving signal tx6 is not changed in the first and second intervals T1 and T2, the phase of the sixth driving signal tx6 is changed in the third and fourth intervals T3 and T4. Accordingly, the code of the sixth driving signal tx6 may be (1, 1, 0, 0, 1, 1, 0, 0, 0, 0, 1, 1, 0, 0, 1, 1) in the first to fourth intervals T1 to T4. While the phase of the seventh driving signal tx7 is not changed in the first and fourth intervals T1 and T4, the phase of the seventh driving signal tx7 is changed in the second and third intervals T2 and T3. Accordingly, the code of the seventh driving signal tx7 may be (1, 1, 0, 0, 0, 0, 1, 1, 0, 0, 1, 1, 1, 1, 0, 0) in the first to fourth intervals T1 to T4. While the phase of the eighth driving signal tx8 is not changed in the first and third intervals T1 and T3, the phase of the eighth driving signal tx8 is changed in the second and fourth intervals T2 and T4. Accordingly, the code of the eighth driving signal tx8 may be (1, 1, 0, 0, 0, 0, 1, 1, 1, 1, 0, 0, 0, 0, 1, 1) in the first to fourth intervals T1 to T4.

A ninth to twelfth driving signals tx9 to tx12 may include two high-state pulses and two low-state pulses in the first to fourth intervals T1 to T4. The two low-state pulses may be generated between the two high-state pulses. The phase of the ninth driving signal tx9 is not changed in the first to fourth intervals T1 to T4, the code of the ninth driving signal tx9 may be (1, 0, 0, 1, 1, 0, 0, 1, 1, 0, 0, 1, 1, 0, 0, 1) in the first to fourth intervals T1 to T4. While the phase of the tenth driving signal tx10 is not changed in the first and second intervals T1 and T2, the phase of the tenth driving signal tx10 is changed in the third and fourth intervals T3 and T4. Accordingly, the code of the tenth driving signal tx10 may be (1, 0, 0, 1, 1, 0, 0, 1, 0, 1, 1, 0, 0, 1, 1, 0) in the first to fourth intervals T1 to T4. While the phase of the eleventh driving signal tx11 is not changed in the first and fourth intervals T1 and T4, the phase of the eleventh driving signal tx11 is changed in the second and third intervals T2 and T3. Accordingly, the code of the eleventh driving signal tx11 may be (1, 0, 0, 1, 0, 1, 1, 0, 0, 1, 1, 0, 1, 0, 0, 1) in the first to fourth intervals T1 to T4. While the phase of the twelfth driving signal tx12 is not changed in the first and third intervals T1 and T3, the phase of the twelfth driving signal tx12 is changed in the second and fourth intervals T2 and T4. Accordingly, the code of the twelfth driving signal tx12 may be (1, 0, 0, 1, 0, 1, 1, 0, 0, 1, 1, 0, 1, 0, 0, 1) in the first to fourth intervals T1 to T4.

A thirteenth to sixteenth driving signals tx13 to tx16 may include a high-state pulse and a low-state pulse, both of which are alternately generated in the first to fourth intervals T1 to T4. The phase of the thirteenth driving signal tx13 is not changed in the first to fourth intervals T1 to T4, the code of the thirteenth driving signal tx13 may be (1, 0, 1, 0, 1, 0, 1, 0, 1, 0, 1, 0, 1, 0, 1, 0) in the first to fourth intervals T1 to T4. While the phase of the fourteenth driving signal tx14 is not changed in the first and second intervals T1 and T2, the phase of the fourteenth driving signal tx14 is changed in the third and fourth intervals T3 and T4. Accordingly, the code of the fourteenth driving signal tx14 may be (1, 0, 1, 0, 1, 0, 1, 0, 0, 1, 0, 1, 0, 1, 0, 1) in the first to fourth intervals T1 to T4. While the phase of the fifteenth driving signal tx15 is not changed in the first and fourth intervals T1 and T4, the phase of the fifteenth driving signal tx15 is changed in the second and third intervals T2 and T3. Accordingly, the code of the fifteenth driving signal tx15 may be (1, 0, 1, 0, 0, 1, 0, 1, 0, 1, 0, 1, 1, 0, 1, 0) in the first to fourth intervals T1 to T4. While the phase of the sixteenth driving signal tx16 is not changed in the first and third intervals T1 and T3, the phase of the sixteenth driving signal tx16 is changed in the second and fourth intervals T2 and T4. Accordingly, the code of the sixteenth driving signal tx16 may be (1, 0, 1, 0, 0, 1, 0, 1, 1, 0, 1, 0, 0, 1, 0, 1) in the first to fourth intervals T1 to T4.

Figure 6:
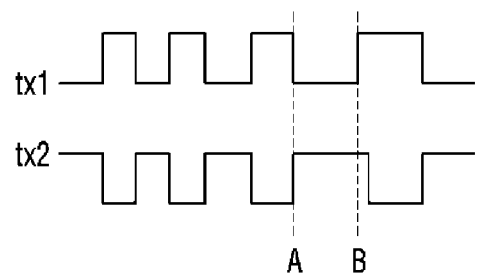
FIG. 6 is a timing diagram showing another embodiment of a waveform of the driving signal shown in FIG. 3.

FIG. 6 is a timing diagram showing another embodiment of a waveform of the driving signal shown in FIG. 3.

Referring to FIG. 6, the driving signal supplier 200 simultaneously applies the first driving signal tx1 and the second driving signal tx2 to at least two driving signal electrodes. The first and second driving signals tx1 and tx2 have a 180 degree phase difference from each other.

The first and second driving signals tx1 and tx2 do not have a constant pulse width, and thus, they may not be periodic pulse signals. For example, the first and second driving signals tx1 and tx2 may have the plurality of pulses of which the periods are not the same as each other, e.g., a spread spectrum pulse. Also, while a falling edge of the first driving signal tx1 and a rising edge of the second driving signal tx2 occur at a point "A" at the same time, the rising edge of the first driving signal tx1 occurs at a point "B" and the falling edge of the second driving signal tx2 behind the point "B". That is, regarding a duty ratio, i.e., a ratio between a high period and a low period of the pulse, the duty ratio of the first driving signal tx1 may be different from that of the second driving signal tx2. Therefore, the frequencies of the first and second driving signals tx1 and tx2 may be different from each other.

Although it has been described above that the duty ratios of the two driving signals of FIG. 3 are different from each other, there is no limit to this. If the pulse phases of the driving signals shown in FIG. 4 or 5 are different from each other, the duty ratios may be different from each other.

Figure 7:
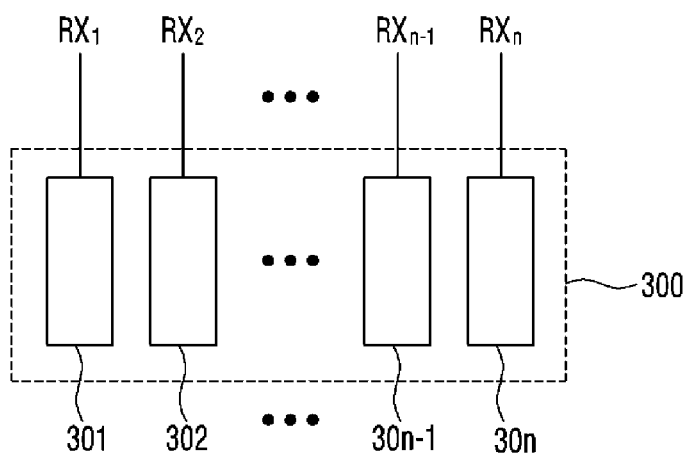
FIG. 7 is a view showing a configuration of a signal sensor applied to FIG. 1.

FIG. 7 is a view showing a configuration of a sensing signal unit applied to FIG. 1.

Referring to FIG. 7, the signal sensor 300 may include a plurality of sensing signal detectors 301, 302, . . . , 30n-1 and 30n. Each of the plurality of sensing signal detectors 301, 302, . . . , 30n-1 and 30n may be connected to one of the plurality of sensing signal electrodes RX1, RX2, . . . , RXn-1 and RXn. Since each of the plurality of sensing signal detectors 301, 302, . . . , 30n-1 and 30n may be configured in the same manner, only the operation of a first sensing signal detector 301 connected to the first sensing signal electrode RX1 will be herein described.

Since the first to fourth driving signals tx1 to tx4 which are simultaneously transmitted to the first to fourth driving signal electrodes TX1 to TX4 in the first interval T1 have a same waveform with the same phase, it can be determined that the first to fourth driving signals tx1 to tx4 have the same positive (+) voltage. Therefore, the first sensing signal detector 301 is able to detect a voltage shown in the following equation (2) from the first sensing signal electrode RX1.

$$V_{RX11} = (C11 + C12 + C13 + C14) \times AV_{TX} \quad \text{Equation (2)}$$

Also, while the first and second driving signals tx1 and tx2 among the first to fourth driving signals tx1 to tx4 which are simultaneously transmitted to the first to fourth driving signal electrodes TX1 to TX4 in the second interval T2 have the same phase, the third and fourth driving signals tx3 and tx4 have a different phase. Therefore, it can be determined that the first and second driving signals tx1 and tx2 have a positive (+) sign and the same magnitude voltage and the third and fourth driving signals tx3 and tx4 have a negative (−) sign and the same magnitude voltage. Accordingly, the first sensing signal detector 301 is able to detect a voltage shown in the following equation (3) from the first sensing signal electrode RX1.

$$V_{RX12} = (C11 + C12 - C13 - C14) \times AV_{TX} \quad \text{Equation (3)}$$

Also, while the first and fourth driving signals tx1 and tx4 among the first to fourth driving signals tx1 to tx4 which are simultaneously transmitted to the first to fourth driving signal electrodes TX1 to TX4 in the third interval T3 have the same phase, the second and third driving signals tx2 and tx3 have a different phase. Therefore, it can be determined that the first and fourth driving signals tx1 and tx4 have a positive sign (+) and the same magnitude voltage and the second and third driving signals tx2 and tx3 have a negative (−) sign and the same magnitude voltage. Accordingly, the first sensing signal detector 301 is able to detect a voltage shown in the following equation (4) from the first sensing signal electrode RX1.

$$V_{RX13} = (C11 - C12 - C13 + C14) \times AV_{TX} \quad \text{Equation (4)}$$

Also, while the first and third driving signals tx1 and tx3 among the first to fourth driving signals tx1 to tx4 which are simultaneously transmitted to the first to fourth driving signal electrodes TX1 to TX4 in the fourth interval T4 have the same phase, the second and fourth driving signals tx2 and tx4 have a different phase. Therefore, it can be determined that the first and third driving signals tx1 and tx3 have a positive (+) sign and the same magnitude voltage and the second and fourth driving signals tx2 and tx4 have a negative (−) sign and the same magnitude voltage. Accordingly, the first sensing signal detector 301 is able to detect a voltage shown in the following equation (5) from the first sensing signal electrode RX1.

$$V_{RX14} = (C11 - C12 + C13 - C14) \times AV_{TX} \quad \text{Equation (5)}$$

In the equations (1) to (4), "$V_{RX11}$ to $V_{RX14}$" may represent the voltage of the sensing signal, which is detected from the first sensing signal electrode RX1 by the first sensing signal detector 301 in the first to fourth intervals T1 to T4. "C11 to C14" may represent the node capacitors connected to the first sensing signal electrode. "$V_{TX}$" may represent the voltage of the driving signal which is applied through the first driving signal electrode. "A" may represent a constant.

Also, the equations (2) to (5) may be represented as a matrix by the following equation (6).

$$\begin{pmatrix} V_{RX_{11}} \\ V_{RX_{12}} \\ V_{RX_{13}} \\ V_{RX_{14}} \end{pmatrix} = AT_X \begin{pmatrix} 1 & 1 & 1 & 1 \\ 1 & 1 & -1 & -1 \\ 1 & -1 & -1 & 1 \\ 1 & -1 & 1 & -1 \end{pmatrix} \begin{pmatrix} C_{11} \\ C_{12} \\ C_{13} \\ C_{14} \end{pmatrix} \quad \text{Equation (6)}$$

It is also possible to identify the capacitance of each of the node capacitors by using the inverse matrix of the equation (6).

The inverse matrix of the equation (6) is shown in the following equation (7).

$$\begin{pmatrix} C_{11} \\ C_{12} \\ C_{13} \\ C_{14} \end{pmatrix} = \frac{1}{AT_X} \begin{pmatrix} 1 & 1 & 1 & 1 \\ 1 & 1 & -1 & -1 \\ 1 & -1 & -1 & 1 \\ 1 & -1 & 1 & -1 \end{pmatrix} \begin{pmatrix} V_{RX_{11}} \\ V_{RX_{12}} \\ V_{RX_{13}} \\ V_{RX_{14}} \end{pmatrix} \quad \text{Equation (7)}$$

Therefore, the capacitances of four node capacitors can be identified at the same time.

Although it has been described that the capacitances of the four node capacitors are identified, there is no limit to this. As shown in FIG. 5, mutually different driving signals are simultaneously applied to the sixteen driving signal electrodes, and then the sensing signal is analyzed in the first to fourth intervals T1 to T4, so that the capacitances of the sixteen node capacitors can be also identified.

Also, the first sensing signal detector 301 may determine the number for which the capacitance of the node capacitor is detected in correspondence with the number of the plurality of pulses of the driving signal. In other words, if the number of the plurality of pulses of the driving signals is four in each of the first to fourth intervals T1 to T4, the first sensing signal detector 301 detects the sensing signal four times in each of the first to fourth intervals T1 to T4 and sums up the detected result, and thus, produces the equation (5). Through the above summation, since noise is distributed by each pulse, the touch panel input apparatus 1000 is less affected by the noise. Accordingly, the touch panel input apparatus 1000 accurately recognizes the touch, thereby improving the touch sensitivity.

Figure 8:
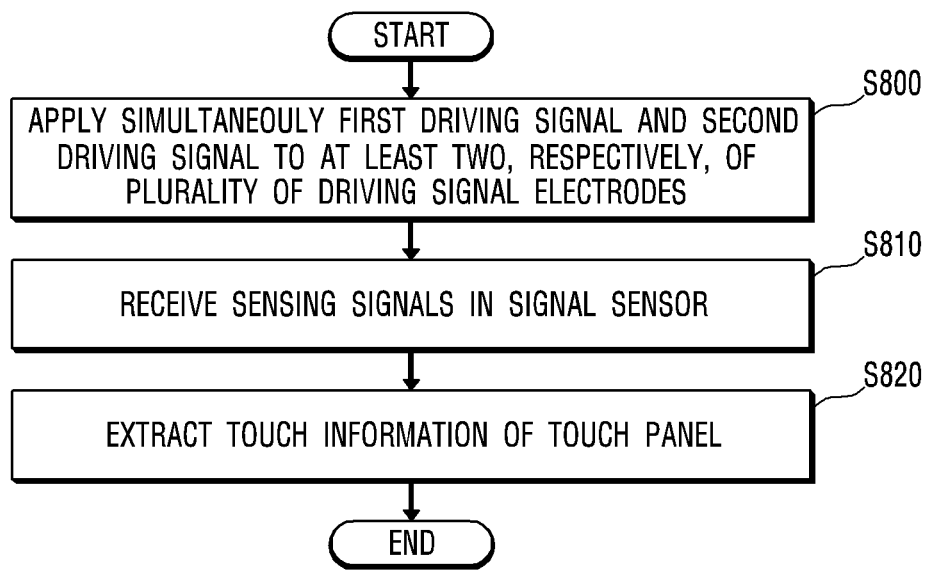
FIG. 8 is a flowchart showing a method for detecting an input in the touch panel shown in FIG. 1.

FIG. 8 is a flowchart showing a method for detecting an input in the touch panel shown in FIG. 1.

Referring to FIG. 8, the touch panel includes the plurality of node capacitors. Each of the node capacitors is formed by one of the plurality of driving signal electrodes and one of the plurality of sensing signal electrodes. In the input detection of the touch panel, at least one of the plurality of pulses has a width different from that of another pulse, and at least one of the plurality of pulses of the second driving signal may be applied to have a phase different from the pulses of the plurality of pulses of the first driving signal in one of the first and second intervals (S800). Here, the first driving signal and the second driving signal include the plurality of pulses in the first and second intervals respectively. In one of the first and second intervals, the pulse of the second driving signal is applied differently from the pulse of the first driving signal. Here, the being applied differently may include that the phase of the pulse of the second driving signal is different from the phase of the pulse of the first driving signal. The plurality of pulses have repeating high and low states. The pulse of the first driving signal may be applied to have a repeat order different from that of the pulse of the second driving signal. The plurality of pulses of each of the first and second driving signals may have repeating high and low states. The repeat order of pulse of the first driving signal may be set to be different from the repeat order of pulse of the second driving signal.

In the first and second intervals, the sensing signal detector may receive the sensing signals including the information on the capacitances of at least two of the plurality of the node capacitors from the plurality of sensing signal electrodes (S810). When the capacitances of the at least two node capacitors are recognized at the same time, touches on the multiple points in the touch panel 100 can be recognized at the same time. In the embodiment, the sensing signal detector may determine the number for which the sensing signal is received in correspondence with the number of the plurality of pulses in the first and second intervals, and produce the information on the capacitance of the node capacitor by summing up the received sensing signals. In other words, if the number of the plurality of pulses is four, the sensing signal detector detects the sensing signal four times in one interval, and thus, identifies the capacitance of the node capacitor by summing up the detected signals. Through the detection of the sensing signal a plurality of times, the noise is distributed, thereby causing the information of the capacitance of the node capacitor to be less affected by the noise and improving the touch sensitivity of the touch panel.

The sensing signal detector may extract touch information of the touch panel by using the information on the capacitance of at least two node capacitors (S820). Here, although it has been described that the sensing signal detector extracts the touch information of the touch panel, there is no limit to this. The information on the capacitance of the node capacitor, which has been detected by the sensing signal detector, may be transmitted to the controller, and then the controller may operate the information and extract the touch information of the touch panel.

The features, structures and effects and the like described in the embodiments are included in at least one embodiment of the present invention and are not necessarily limited to one embodiment. Furthermore, the features, structures, effects and the like provided in each embodiment can be combined or modified in other embodiments by those skilled in the art to which the embodiments belong. Therefore, contents related to the combination and modification should be construed to be included in the scope of the present invention.

Although embodiments of the present invention were described above, these are just examples and do not limit the present invention. Further, the present invention may be changed and modified in various ways, without departing from the essential features of the present invention, by those skilled in the art. For example, the components described in detail in the embodiments of the present invention may be modified. Further, differences due to the modification and application should be construed as being included in the scope and spirit of the present invention, which is described in the accompanying claims.

What is claimed is:

1. A touch panel input device comprising:
   a touch panel comprising a plurality of node capacitors, each of which is formed by one of a plurality of driving signal electrodes and one of a plurality of sensing signal electrodes;
   a driving signal supplier simultaneously applying a first driving signal and a second driving signal to at least two of the plurality of driving signal electrodes, respectively, wherein each of the first and second driving signals comprise (a) a baseline state and (b) a plurality of pulses in each of a first interval and a second interval, respectively, wherein:
   each pulse comprises a rapid change in amplitude from the baseline state to a higher or lower state, followed by a rapid return to the baseline state;
   for each of the first and second intervals of each of the first and second driving signals, at least one of the plurality of pulses has a width different from that of another pulse;
   at least one of the plurality of pulses of the second driving signal has a phase different from those of the plurality of pulses of the first driving signal in one of the first and second intervals; and
   the first and second driving signals are generated from codes, and each of the plurality of pulses in each of the first and second intervals of each of the first and second driving signals is separately represented in the codes; and
   a signal sensor receiving a plurality of sensing signals, each pulse of each of the first and second driving signals in each of the first and second intervals producing one of the sensing signals, wherein the plurality of sensing signals includes information on capacitances of at least two of the plurality of the node capacitors from the plurality of sensing signal electrodes in the first and second intervals.

2. The touch panel input device of claim 1, wherein at least one of the plurality of pulses comprises a high-state signal, and another pulse is a low-state signal.

3. The touch panel input device of claim 2, wherein the pulse width of the high-state signal is different from the pulse width of the low-state signal.

4. The touch panel input device of claim 3, wherein the high-state signal and the low-state signal are alternately generated.

5. The touch panel input device of claim 3, wherein, in the second interval, a duty ratio of at least one of the plurality of pulses of the first driving signal is different from a duty ratio of at least one of the plurality of pulses of the second driving signal.

6. The touch panel input device of claim 2, wherein the high-state signal and the low-state signal are alternately generated.

7. The touch panel input device of claim 2, wherein, in the second interval, a duty ratio of at least one of the plurality of pulses of the first driving signal is different from a duty ratio of at least one of the plurality of pulses of the second driving signal.

8. The touch panel input device of claim 1, wherein, in the second interval, a duty ratio of at least one of the plurality of pulses of the first driving signal is different from a duty ratio of at least one of the plurality of pulses of the second driving signal.

9. The touch panel input device of claim 1, wherein the signal sensor determines a number of times which the sensing signal is received in correspondence with a number of the plurality of pulses in the first and second intervals, and produces the information on the capacitance of the node capacitor by summing up the received sensing signals.

10. The touch panel input device of claim 1, further comprising a controller, wherein the controller further comprises a memory which stores codes corresponding to the first interval and the second interval, and wherein forms of the first driving signal and the second driving signal are determined by the codes.

11. The touch panel input device of claim 1, wherein the plurality of pulses of the second driving signal comprises a plurality of high-state signals and a plurality of low-state signals, wherein in each of the first interval and the second interval, a width of at least one of the plurality of high-state signals is different from a width of at least one of the plurality of low-state signals, and a width of at least one of the plurality of high-state signals is same as a width of at least one of the plurality of low-state signals.

12. An input detection method of a touch panel comprising a plurality of node capacitors, each of which is formed by one of a plurality of driving signal electrodes and one of a plurality of sensing signal electrodes, the method comprising:
applying simultaneously a first driving signal and a second driving signal to at least two of the plurality of driving signal electrodes respectively, wherein each of the first and second driving signals comprise (a) a baseline state and (b) a plurality of pulses in each of a first interval and a second interval, respectively, wherein:
each pulse comprises a rapid change in amplitude from the baseline state to a higher or lower state, followed by a rapid return to the baseline state;
for each of the first and second intervals of each of the first and second driving signals, at least one of the plurality of pulses has a width different from that of another pulse;
at least one of the plurality of pulses of the second driving signal may be applied to have a phase different from the pulses of the plurality of pulses of the first driving signal in one of the first and second intervals;
the first and second driving signals are generated from codes, and each of the plurality of pulses in each of the first and second intervals of each of the first and second driving signals is separately represented in the codes;
receiving a plurality of sensing signals, each pulse of each of the first and second driving signals in each of the first and second intervals producing one of the sensing signals, wherein the plurality of sensing signals includes information on capacitances of at least two of the plurality of the node capacitors from the plurality of sensing signal electrodes in the first and second intervals by a sensing signal detector; and
extracting touch information of the touch panel by using the information on the capacitances of the at least two node capacitors by the sensing signal detector.

13. The method of claim 12, wherein the plurality of pulses have repeating high and low states, and wherein in the applying simultaneously the first driving signal and the second driving signal, a repeat order of pulse of the first driving signal is different from a repeat order of pulse of the second driving signal.

14. The method of claim 13, wherein the pulse width of the high-state signal is different from the pulse width of the low-state signal.

15. The method of claim 14, wherein, in the second interval, a duty ratio of at least one of the plurality of pulses of the first driving signal is different from a duty ratio of at least one of the plurality of pulses of the second driving signal.

16. The method of claim 13, wherein, in the second interval, a duty ratio of at least one of the plurality of pulses of the first driving signal is different from a duty ratio of at least one of the plurality of pulses of the second driving signal.

17. The method of claim 12, wherein the widths of the plurality of pulses are increased with the lapse of time.

18. The method of claim 17, wherein, in the second interval, a duty ratio of at least one of the plurality of pulses of the first driving signal is different from a duty ratio of at least one of the plurality of pulses of the second driving signal.

19. The method of claim 12, wherein, in the second interval, a duty ratio of at least one of the plurality of pulses of the first driving signal is different from a duty ratio of at least one of the plurality of pulses of the second driving signal.

20. A touch panel input device comprising:
a touch panel comprising a plurality of node capacitors, each of which is formed by one of a plurality of driving signal electrodes and one of a plurality of sensing signal electrodes;
a driving signal supplier simultaneously applying a first driving signal and a second driving signal to at least two of the plurality of driving signal electrodes, respectively, wherein each of the first and second driving signals comprise (a) a baseline state and (b) a plurality of pulses in each of a first interval and a second interval, respectively, wherein (a) for each of the first and second intervals of each of the first and second driving signals, at least one of the plurality of pulses has a width different from that of another pulse, and (b) at least one of the plurality of pulses of the second driving signal has a phase different from those of the plurality of pulses of the first driving signal in one of the first and second intervals; and
a signal sensor receiving a plurality of sensing signals, each pulse of each of the first and second driving signals in each of the first and second intervals producing one of the sensing signals, wherein the plurality of sensing signals includes information on capacitances of at least two of the plurality of the node capacitors from the plurality of sensing signal electrodes in the first and second intervals;

wherein each pulse comprises a rapid change in amplitude from the baseline state to a higher or lower state, followed by a rapid return to the baseline state; and wherein a plurality of pulse sequences are formed by the first and second driving signals, each pulse sequence formed by the plurality of pulses of each of the first and second intervals for each of the first and second driving signals; and wherein the plurality of pulse sequences comprises at least three distinct pulse sequences.

* * * * *